US012617398B2

(12) United States Patent
Creighton et al.

(10) Patent No.: US 12,617,398 B2
(45) Date of Patent: May 5, 2026

(54) VEHICLE DECELERATION CONTROL

(71) Applicant: Ford Global Technologies, LLC, Dearborn, MI (US)

(72) Inventors: William Creighton, Northville, MI (US); Michael Hafner, San Carlos, CA (US); Andrew Fallon, Berkley, MI (US); Timothy Zwicky, Dearborn, MI (US); Abhishek Sharma, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 396 days.

(21) Appl. No.: 18/067,794

(22) Filed: Dec. 19, 2022

(65) Prior Publication Data

US 2024/0199015 A1       Jun. 20, 2024

(51) Int. Cl.
B60W 30/14        (2006.01)
B60W 10/18        (2012.01)
(Continued)

(52) U.S. Cl.
CPC .......... B60W 30/146 (2013.01); B60W 10/18 (2013.01); B60W 30/181 (2013.01); B60W 30/182 (2013.01); B60W 40/105 (2013.01); B60W 50/0098 (2013.01); B60W 2050/0028 (2013.01); B60W 2556/40 (2020.02); B60W 2720/106 (2013.01)

(58) Field of Classification Search
CPC .. B60W 30/146; B60W 10/18; B60W 30/181; B60W 30/182; B60W 50/0098; B60W 2720/106; B60W 2520/10
See application file for complete search history.

(56) References Cited

U.S. PATENT DOCUMENTS

2005/0264099 A1* 12/2005 Kamiya ................... B60T 7/22
                                                        303/15
2014/0379213 A1* 12/2014 Otake ...................... B60K 6/48
                                                        701/36
(Continued)

FOREIGN PATENT DOCUMENTS

CN          113362619 A       9/2021

OTHER PUBLICATIONS

Khaled et al., "Intersection Control for Autonomous Vehicles Using Control Barrier Function Approach", 2020 2nd Novel Intelligent and Leading Emerging Sciences Conference (NILES), DOI:10.1109/NILES50944.2020.9257886—Abstract Only.
(Continued)

Primary Examiner — Toya Pettiegrew
(74) Attorney, Agent, or Firm — Frank A. MacKenzie; Brooks Kushman P.C.

(57) ABSTRACT

A system includes a computer including a processor and a memory. The computer is programmed to determine a target location for a vehicle; based on a vehicle speed and a distance to the target location, determine a tunable acceleration parameter; determine a constraint, based on the tunable acceleration parameter, for a control barrier function to that outputs an acceleration to stop the vehicle at the target location; and upon solving the control barrier function to satisfy the constraint, actuate the vehicle to decelerate based on the acceleration output from the control barrier function.

20 Claims, 3 Drawing Sheets

(51) Int. Cl.

| | |
|---|---|
| *B60W 30/18* | (2012.01) |
| *B60W 30/182* | (2020.01) |
| *B60W 40/105* | (2012.01) |
| *B60W 50/00* | (2006.01) |

(56) References Cited

U.S. PATENT DOCUMENTS

| | | | | |
|---|---|---|---|---|
| 2021/0188268 | A1* | 6/2021 | Goto .................. | B60W 30/181 |
| 2021/0365596 | A1 | 11/2021 | Heersink et al. | |
| 2022/0258731 | A1* | 8/2022 | Kuno .................. | B60W 50/14 |
| 2022/0281455 | A1* | 9/2022 | Sarlashkar .......... | B60W 40/105 |
| 2023/0135494 | A1* | 5/2023 | Okamoto .............. | B60W 50/02 |
| | | | | 701/23 |
| 2023/0174044 | A1* | 6/2023 | Kumazaki ............. | B60W 20/12 |
| | | | | 701/99 |
| 2024/0096189 | A1* | 3/2024 | Shimotani .............. | H04N 7/185 |

OTHER PUBLICATIONS

Shivam et al., "Intersection-Traffic Control of Autonomous Vehicles using Newton-Raphson Flows and Barrier Functions", arXiv:2004. 10226v1 [eess.SY] Apr. 21, 2020.

Wada et al., "Characterization of Expert Drivers' Last-Second Braking and Its Application to a Collision Avoidance System", EEE Transactions on Intelligent Transportation Systems—Jul. 2010, DOI: 10.1109/TITS.2010.2043672—Source: IEEE Xplore.

Xiao et al., "Decentralized Merging Control in Traffic Networks: A Control Barrier Function Approach", ICCPS '19, Apr. 16-18, 2019, Montreal, QC, Canada, https://doi.org/10.1145/3302509.3311054.

* cited by examiner

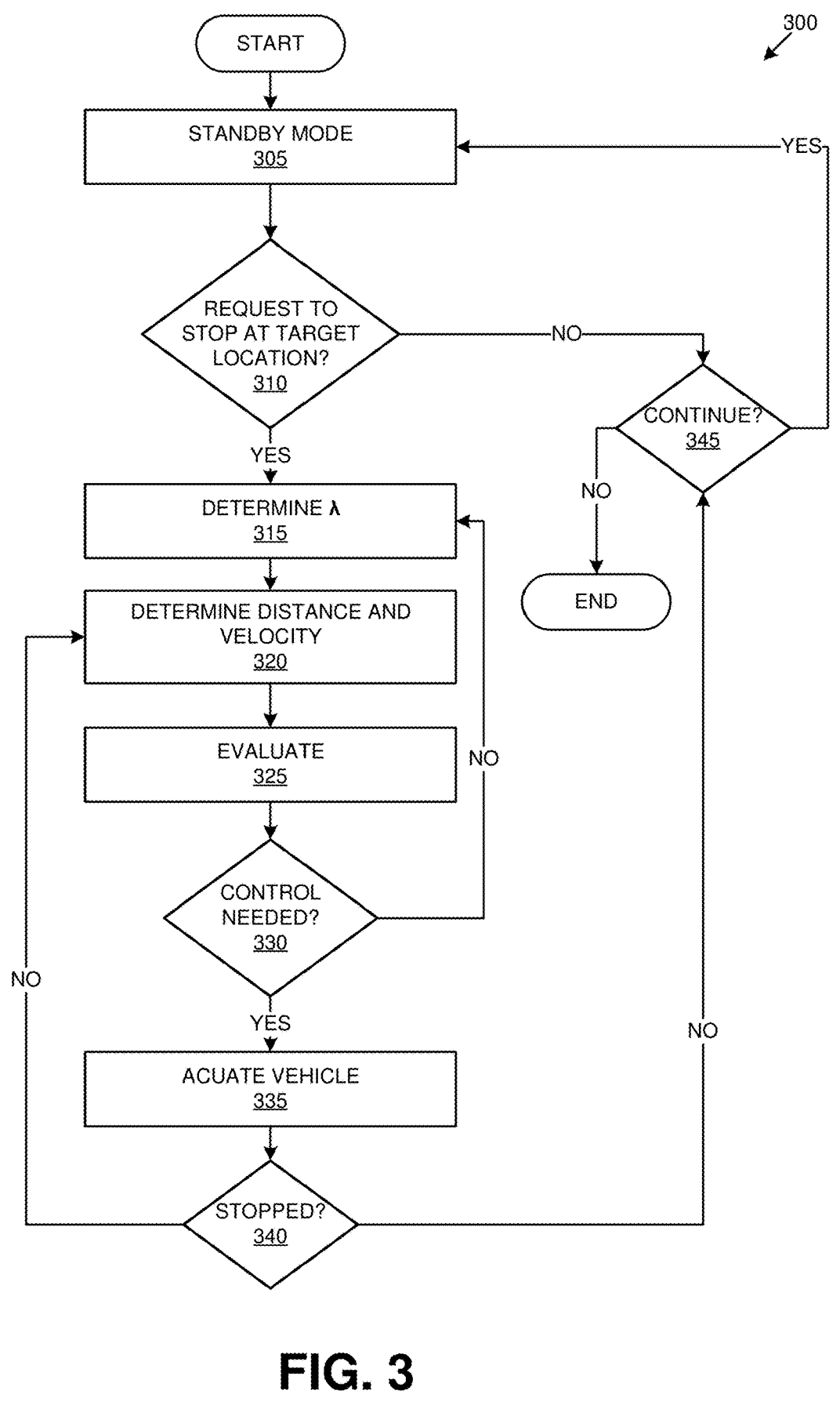

300

START

STANDBY MODE
305

REQUEST TO
STOP AT TARGET
LOCATION?
310

NO

YES

DETERMINE λ
315

DETERMINE DISTANCE AND
VELOCITY
320

EVALUATE
325

NO

CONTROL
NEEDED?
330

YES

ACUATE VEHICLE
335

STOPPED?
340

NO

NO

CONTINUE?
345

YES

NO

END

FIG. 3

VEHICLE DECELERATION CONTROL

BACKGROUND

Vehicles can operate in various autonomous or semi-autonomous modes in which one or more components such as a propulsion, a brake system, and/or a steering system of the vehicle are controlled by a vehicle computer. Various existing systems that can operate vehicle components include systems such as adaptive cruise control, which can control speed of a vehicle in certain situations, including by adapting the speed of the ego vehicle to one or more other vehicles; lane-centering, in which vehicle steering is controlled to maintain a lateral position of a vehicle in the lane of travel; and lane-changing, in which a vehicle steering, acceleration, and/or braking can be controlled to move a vehicle from one lane of travel to another. Such systems may be referred to as Advanced Driver Assistance Systems (ADAS). In some examples, an ADAS system can perform vehicle braking.

BRIEF DESCRIPTION OF THE DRAWINGS

FIG. 3 illustrates an example process for controlling vehicle deceleration.

DESCRIPTION

Figure 1:
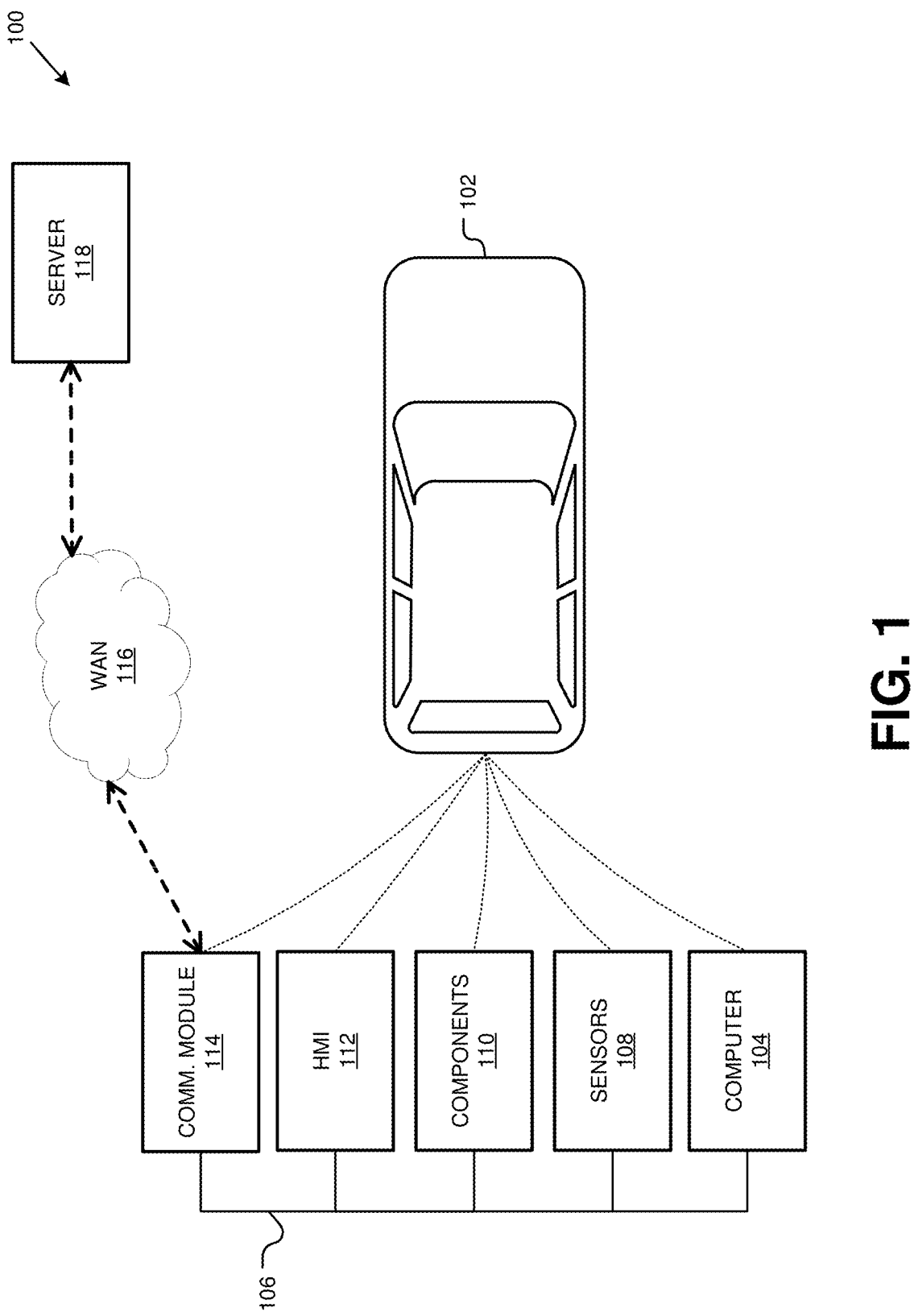
FIG. 1 is a block diagram of an example vehicle system.
Figure 2:
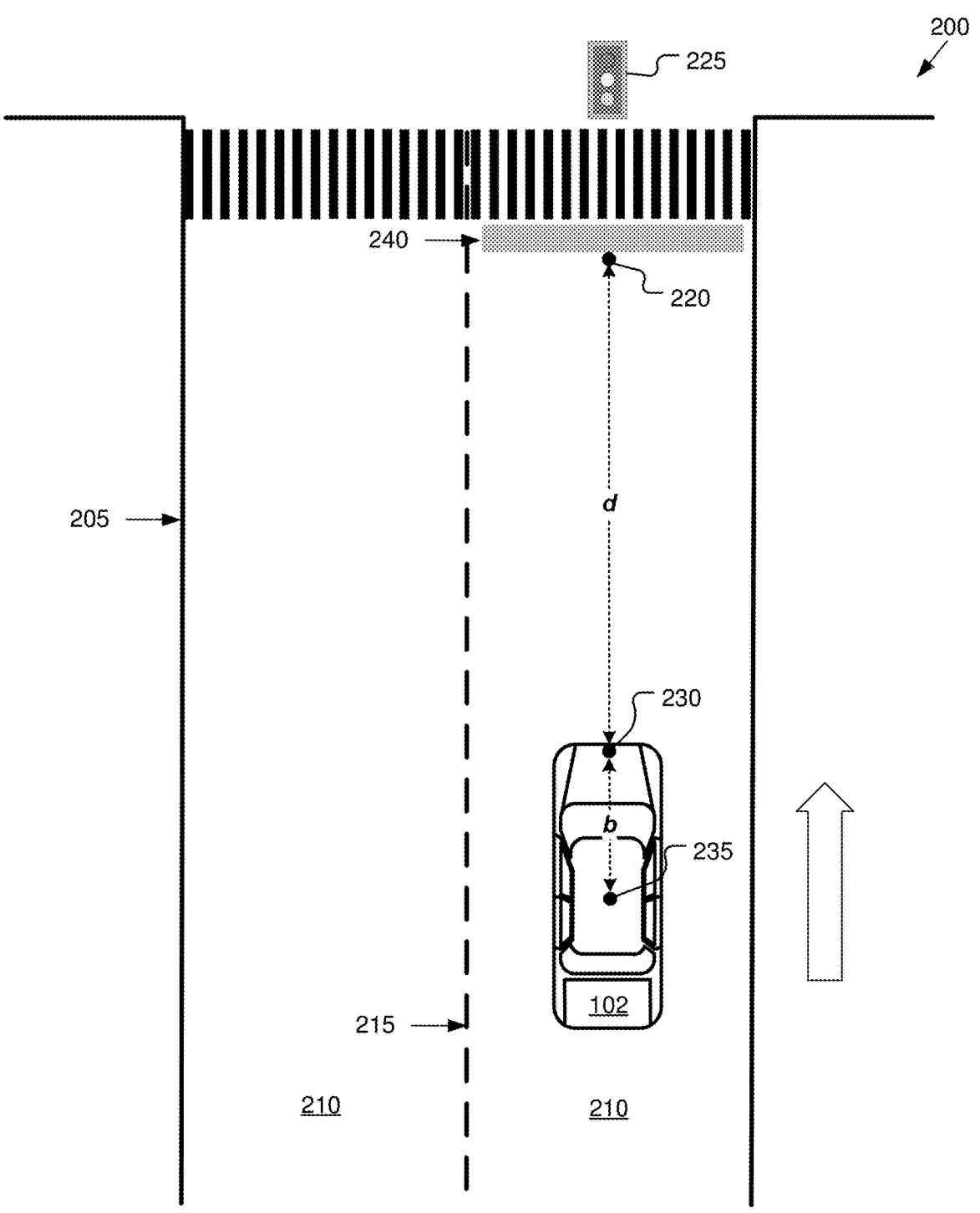
FIG. 2 is a schematic diagram of an example traffic scene.

Referring initially to FIGS. 1 and 2, the present disclosure describes implementing a control barrier function (CBF) to control deceleration and/or stopping of a host vehicle 102 traveling on a roadway 205 toward a target location 220. A CBF is a statement of a mathematical relationship that includes one or more constraints to be satisfied. A CBF can be useful for determining an input to a control system when it is desired to constrain the input so that outputs from the control system will be appropriately limited. For example, as described herein, a CBF can be defined that models vehicle motion, including velocity, acceleration, and distance from a location such as a target location 220, and includes constraints related to deceleration requests input to a vehicle computer 104 to slow a vehicle as it moves toward, and stops at, a target location 220. Thus, the present implementation of a CBF advantageously controls vehicle deceleration so that deceleration is commanded in a manner that is effective to stop the vehicle 102 at a target location 220 and is designed to be efficient and comfortable for vehicle users. In short, implementation of a CBF as described herein can provide good vehicle operation, including control of vehicle acceleration and/or braking. (Note that herein, "acceleration" can mean positive acceleration, i.e., increasing velocity, or negative acceleration, i.e., decreasing velocity, also referred to as "deceleration.").

The present disclosure includes a system comprising a computer including a processor and a memory, the memory storing instructions executable by the processor such that the computer is programmed to: determine a target location for a vehicle; based on a vehicle speed and a distance to the target location, determine a tunable acceleration parameter; determine a constraint, based on the tunable acceleration parameter, for a control barrier function to that outputs an acceleration to stop the vehicle at the target location; and on solving the control barrier function to satisfy the constraint, actuate the vehicle to decelerate based on the acceleration output from the control barrier function.

The acceleration output can specify a negative acceleration. Actuating the vehicle to decelerate can include one of actuating vehicle braking or vehicle propulsion. The constraint can be further determined based on the vehicle speed and the distance to the target location.

The instructions can include instructions to, after actuating the vehicle to decelerate based on the acceleration output from the control barrier function: determine a second vehicle speed and a second distance to the target location; determine second constraint; compute a second acceleration output from the control barrier function to satisfy the second constraint; and actuate the vehicle to decelerate based on the second acceleration output from the control barrier function.

The instructions can include instructions to actuate the vehicle to decelerate based on the acceleration output from the control barrier function only if actuating the vehicle is needed for the constraint to be satisfied. The instructions can further include instructions to, after determining that actuating the vehicle is not needed for the constraint to be satisfied, determine a second vehicle speed and a second distance to the target location; determine a second tunable acceleration parameter based on the second vehicle speed and the second distance to the target location; determine second constraint based on the second tunable acceleration parameter; compute a second acceleration output from the control barrier function to satisfy the second constraint; determine that actuating the vehicle to decelerate is needed for the second constraint to be satisfied; and actuate the vehicle to decelerate based on the second acceleration output from the control barrier function.

The control barrier function can include the distance of the vehicle from the target location at a current time, and can further include a velocity of the vehicle at the current time.

The control barrier function can include a maximum deceleration parameter and/or a buffer parameter.

The target location is determined can be determined based on map data and/or based on vehicle sensor data.

The instructions can include instructions to enter a standby mode of the system upon determining that the vehicle has stopped at the target location and then moved from the target location.

A method comprises determining a target location for a vehicle; based on a vehicle speed and a distance to the target location, determining a tunable acceleration parameter; determining a constraint, based on the tunable acceleration parameter, for a control barrier function to that outputs an acceleration to stop the vehicle at the target location; and upon solving the control barrier function to satisfy the constraint, actuating the vehicle to decelerate based on the acceleration output from the control barrier function.

The method can further comprise: determining a second vehicle speed and a second distance to the target location; determining second constraint; computing a second acceleration output from the control barrier function to satisfy the second constraint; and actuating the vehicle to decelerate based on the second acceleration output from the control barrier function.

The method can further comprise actuating the vehicle to decelerate based on the acceleration output from the control barrier function only if actuating the vehicle is needed for the constraint to be satisfied. The can further comprise, after determining that actuating the vehicle is not needed for the constraint to be satisfied: determining a second vehicle speed and a second distance to the target location; determining a second tunable acceleration parameter based on the second vehicle speed and the second distance to the target location; determining second constraint based on the second tunable acceleration parameter; computing a second acceleration output from the control barrier function to satisfy the second constraint; determining that actuating the vehicle to decelerate is needed for the second constraint to be satisfied; and actuating the vehicle to decelerate based on the second acceleration output from the control barrier function.

The control barrier function can include the distance of the vehicle from the target location at a current time, and/or a velocity of the vehicle at the current time, and or a maximum deceleration parameter.

Turning to FIG. 1, as mentioned above, a vehicle system 100 includes elements that may be provided at least partly to support a vehicle ADAS including a computer 104 that includes a processor and a memory. The memory includes one or more forms of computer 104 readable media, and stores instructions executable by the vehicle computer 104 for performing various operations, including as disclosed herein. For example, a vehicle computer 104 can be a generic computer with a processor and memory as described above and/or may include an electronic control unit (ECU) or controller for a specific function or set of functions, and/or a dedicated electronic circuit including an ASIC (application specific integrated circuit) that is manufactured for a particular operation, e.g., an ASIC for processing sensor 108 data and/or communicating the sensor 108 data. In another example, a vehicle computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components 110 inside an FPGA may be configured based on VHDL programming, e.g. stored in a memory electrically connected to the FPGA circuit. In some examples, a combination of processor(s), ASIC(s), and/or FPGA circuits may be included in a computer 104.

The memory can be of any type, e.g., hard disk drives, solid state drives, servers 118, or any volatile or non-volatile media. The memory can store the collected data sent from the sensors 108. The memory can be a separate device from the computer 104, and the computer 104 can retrieve information stored by the memory via a network in the vehicle 102, e.g., over a CAN bus, a wireless network, etc. Alternatively or additionally, the memory can be part of the computer 104, e.g., as a memory of the computer 104.

The computer 104 may include programming to operate one or more of vehicle 102 brakes, propulsion e.g., control of acceleration in the vehicle 102 by controlling one or more of an internal combustion engine, electric motor, hybrid engine, etc., steering, climate control, interior and/or exterior lights, etc., as well as to determine whether and when the computer 104, as opposed to a human operator, is to control such operations. Additionally, the computer 104 may be programmed to determine whether and when a human operator is to control such operations. The computer 104 may include or be communicatively coupled to, e.g., via a vehicle network 106 such as a communications bus as described further below, more than one processor, e.g., included in components 110 such as sensors 108, electronic control units (ECUs) or the like included in the vehicle 102 for monitoring and/or controlling various vehicle components, e.g., a powertrain controller, a brake controller, a steering controller, etc.

The computer 104 is generally arranged for communications on a vehicle network 106 that can include a communications bus in the vehicle 102 such as a controller area network CAN or the like, and/or other wired and/or wireless mechanisms. The vehicle network 106 is a communications network via which messages can be exchanged between various devices, e.g., sensors 108, components 110, computer 104(s), etc. in vehicle 102. The computer 104 can be generally programmed to send and/or receive, via vehicle network 106, messages to and/or from other devices in vehicle 102 e.g., any or all of ECUs, sensors 108, actuators, components 110, communications module, a human machine interface (HMI), etc. For example, various component 110 subsystems (e.g., components 110 can be controlled by respective ECUs) and/or sensors 108 may provide data to the computer 104 via the vehicle 102 communication network. Further, in cases in which a computer 104 actually comprises a plurality of devices, the vehicle network 106 may be used for communications between devices represented as computer 104 in this disclosure.

A vehicle network 106 can include a controller area network CAN in which messages are conveyed via a CAN bus, or a local interconnect network LIN in which messages are conveyed via a LIN bus, for example. In some implementations, vehicle network 106 can include a network in which messages are conveyed using other wired communication technologies and/or wireless communication technologies e.g., Ethernet, WI-FI®, BLUETOOTH®, etc. Additional examples of protocols that may be used for communications over vehicle network 106 in some implementations include, without limitation, Media Oriented System Transport MOST, Time-Triggered Protocol TTP, and FlexRay. In some implementations, vehicle network 106 can represent a combination of multiple networks, possibly of different types, that support communications among devices in vehicle 102. For example, vehicle network 106 can include a CAN in which some devices in vehicle 102 communicate via a CAN bus, and a wired or wireless local area network in which some device in vehicle 102 communicate according to Ethernet or Wi-Fi communication protocols.

The vehicle 102 typically includes a variety of sensors 108. A sensor 108 is a device that can obtain one or more measurements of one or more physical phenomena. Some sensors 108 detect internal states of the vehicle 102, for example, wheel speed, wheel orientation, and engine and transmission variables. Some sensors 108 detect the position or orientation of the vehicle 102, for example, global positioning system GPS sensors 108; accelerometers such as piezo-electric or microelectromechanical systems MEMS; gyroscopes such as rate, ring laser, or fiber-optic gyroscopes; inertial measurements units IMU; and magnetometers. Some sensors 108 detect the external world, for example, radar sensors 108, scanning laser range finders, light detection and ranging LIDAR devices, and image processing sensors 108 such as cameras. A LIDAR device detects distances to objects by emitting laser pulses and measuring the time of flight for the pulse to travel to the object and back. Some sensors 108 are communications devices, for example, vehicle-to-infrastructure V2I or vehicle-to-vehicle V2V devices. Often, but not necessarily, a sensor 108 includes a digital-to-analog converter to converted sensed analog data to a digital signal that can be provided to a digital computer 104, e.g., via a network.

Sensors 108 can include a variety of devices, and can be disposed to sense and environment, provide data about a machine, etc., in a variety of ways. For example, a sensor 108 could be mounted to a stationary infrastructure element on, over, or near a road. Moreover, various controllers in a vehicle 102 may operate as sensors 108 to provide data via the vehicle network 106 or bus, e.g., data relating to vehicle 102 speed, acceleration, location, subsystem and/or component 110 status, etc. Further, other sensors 108, in or on a vehicle 102, stationary infrastructure element, etc., infrastructure could include cameras, short range radar, long range radar, LIDAR, and/or ultrasonic transducers, weight sensors 108, accelerometers, motion detectors, etc., i.e., sensors 108 to provide a variety of data. To provide just a few non-limiting examples, sensor 108 data could include data for determining a position of a component 110, a location of an object, a speed of an object, a type of an object, a slope of a roadway 205, a temperature, a presence or amount of moisture, a fuel level, a data rate, etc.

The computer 104 may include programming to command one or more actuators to operate one or more vehicle 102 subsystems or components 110, such as vehicle 102 brakes, propulsion, or steering. That is, the computer 104 may actuate control of acceleration in the vehicle 102 by controlling one or more of an internal combustion engine, electric motor, hybrid engine, etc., and/or may actuate control of brakes, steering, climate control, interior and/or exterior lights, etc. The computer 104 may include or be communicatively coupled to, e.g., via a vehicle network 106, more than one processor, e.g., included in components 110 such as sensors 108, electronic control units (ECUs) or the like for monitoring and/or controlling various vehicle components, e.g., ECUs or the like such as a powertrain controller, a brake controller, a steering controller, etc.

The vehicle 102 can include an HMI 112 (human-machine interface), e.g., one or more of a display, a touchscreen display, a microphone, a speaker, etc. The user can provide input to devices such as the computer 104 via the HMI 112. The HMI 112 can communicate with the computer 104 via the vehicle network 106, e.g., the HMI 112 can send a message including the user input provided via a touchscreen, microphone, a camera that captures a gesture, etc., to a computer 104, and/or can display output, e.g., via a screen, speaker, etc.

The computer 104 may be configured for communicating via a communication module 114 or interface with devices outside of the vehicle 102, e.g., through a wide area network 116 and/or vehicle-to-vehicle (V2V), vehicle-to-infrastructure or everything (V2X) or vehicle-to-everything including cellular communications (C-V2X) wireless communications cellular, DSRC., etc. to another vehicle 102, to an infrastructure element typically via direct radio frequency communications and/or typically via the network a remote server 118. The module could include one or more mechanisms by which the computers 104 of vehicles 102 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, dedicated short range communications DSRC, cellular V2X CV2X, and the like.

A computer 104 can be programmed to communicate with one or more remote sites such as a remote server 118, via a wide area network 116. The wide area network 116 can include one or more mechanisms by which a vehicle computer 104 may communicate with, for example, a remote server 118. Accordingly, the network can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth, Bluetooth Low Energy BLE, IEEE 802.11, vehicle-to-vehicle V2V or vehicle 102 to everything V2X such as cellular V2X CV2X, Dedicated Short Range Communications DSRC, etc., local area networks and/or wide area networks 116, including the Internet, providing data communication services.

The server 118 may include one or more computing devices, e.g., having respective processors and memories and/or associated data stores, that are accessible via the wide area network 116.

FIG. 2 is a schematic diagram of an example traffic scene 200 in which a vehicle 102 is operating on a roadway 205 that includes lanes 210 separated by a lane boundary 215. The arrow to the right of the vehicle 102 shows a direction of travel of the vehicle 102 in a lane 210 of the roadway 205. The vehicle 102 is a distance d from a target location 220, i.e., a location at which it is desired that the vehicle be stopped. For example, a vehicle computer 104 could determine the target location 220 based on detecting a stopping indicia, such as a red or yellow traffic light 225, a stop sign, etc., in a field of view of one or more sensors 108. Further, the target location 220 could be defined based on a marking or indicia on a roadway, such as a painted line or rectangle 240 specifying a location at an intersection of roadways at which a vehicle 102 should stop, e.g., for a stop sign or red traffic light. Alternatively or additionally, the vehicle computer 104 could identify a target location from map data stored in a memory of the computer 104 and/or provided from a remote server 118. That is, the map data could specify a location of a stop sign, traffic light, etc. Yet further, a vehicle 102 could receive a target location 220 via V2X communications, e.g., from a roadside infrastructure unit or the like. Yet further, a target location could be established and/or modified with respect to an object such as another vehicle. For example, if a vehicle 102 is following a second vehicle that comes to a stop, e.g., at a stop sign or red traffic light at an intersection, then a target location 220 or the vehicle 102 could be determined as a specified distance from a rear point of the second, lead vehicle.

As seen in FIG. 2, the distance d from the target location 220 can be measured as a distance from the target location 220 to a point 230 on the vehicle 102. For example, the point 230 may be on a front bumper or other forward-most position on the vehicle 102, wherein it is desired that the vehicle 102 stop at the target location 220 when the point 230 coincides or overlaps with the target location 220. Further, a vehicle computer 104 may determine a vehicle location or position with respect to a reference point 235 on the vehicle 102, e.g., a position where longitudinal and lateral axes of the vehicle 102 intersect in a horizontal plane. Accordingly, as discussed further below, the computer 104 may store a buffer distance b that is a distance between the points 230, 235.

To develop a control barrier function (CBF) that can be implemented to stop the vehicle 102 at a target location 220, vehicle motion can be modeled according to a double integrator model as shown in Equation 1:

$$\begin{bmatrix} \dot{d}(t) \\ \dot{v}(t) \end{bmatrix} = \begin{bmatrix} -v(t) \\ u(t) \end{bmatrix} \tag{1}$$

where v(t) represents velocity of the vehicle 102 as a function of time, and u(t) is a control input such as positive or negative acceleration as a function of time. A double integrator model is a well-understood example of a second-order control system in which a control input is a second derivative of a control output, i.e., in this example, acceleration is a second derivative of distance.

As explained above, a control barrier function (CBF) is a barrier function that outputs a value that can be subjected to a constraint to be satisfied along with a mathematical relationship evaluated by the CBF. For example, a control barrier function incorporating the double integrator model of vehicle motion can determine a control input u. In one example implementation, it has been found to be advantageous to define a control barrier function:

$$h(d(t), v(t)) = d(t) - b - \frac{v(t)^2}{2D}. \tag{2}$$

where v(t) represents velocity of the vehicle 102 as a function of time, d(t) represents distance as a function of time, b is a buffer value such as described above, and D is a maximum deceleration value or parameter that is empirically determined, i.e., by operating a vehicle on a roadway or test track and recording vehicle and/or user responses, to ensure that the value of u will not be impractical or undesirable.

Equation 2 is used, to provide a CBF that, when implemented with a constraint as shown in Equation 3 below, can ensure that the control input stays within a desirable range, e.g., an overly large deceleration command could cause occupant discomfort and generally is not desirable when stopping a vehicle, can be used to control vehicle deceleration.

A constraint for the CBF of Equation 2 can be provided according to:

$$\dot{h}(d, v) + \lambda h(d, v) \geq 0. \tag{3}$$

If the constraint in Equation 3 is satisfied for all future times, then a lower bound on h(t) is given by:

$$h(t) \geq h(0)e^{-\lambda t}, \tag{4}$$

The value e is Euler's constant, i.e., the base of natural logarithms. λ is introduced as a tuning variable, i.e., provides a tunable parameter for a CBF, and will be described further below. As will be seen, Equation 4 provides a lower-bound solution to Equation 3, i.e., if the expression evaluated in Equation 3 is equal to zero, then Equation 4 would be an equality, i.e., as the solution to the differential equation of Equation 3. Put another way, maintaining the relationship of Equation 3 means that the expression in Equation 4 will be satisfied, which in turn means that will never become negative, meaning that, when the CBF is implemented, the vehicle 102 will not pass the stopping location 220. Then, substituting from Equation 2, we obtain:

$$-v - \frac{vu}{D} + \lambda\left(d - b - \frac{v^2}{2D}\right) \geq 0, \tag{5}$$

which can be rearranged as follows to isolate the control input u:

$$\frac{D}{v}\left(-v + \lambda\left(d - b - \frac{v^2}{2D}\right)\right) \geq u. \tag{6}$$

Expression 6 can be evaluated and optimized in a vehicle computer 104 to provide the control input u (e.g., a deceleration, or negative acceleration, command) during a vehicle 102 slowing and/or stopping operation.

As will be understood from Equation 5, when λ is smaller, the control input will be smaller over time, and a greater time and distance will be required for a vehicle 102 to reach a target location 220. On the other hand, if λ is larger, then a large control input may be applied with less time and distance to reach the target location 220. Further, λ may be different at different vehicle 102 speeds and/or distances from a target location 220. Tuning values λ can be determined for various vehicles 102 empirically, e.g., by operating different makes, models, sizes (e.g., weights or masses) of vehicles 102 in a test environment to obtain desired stopping distances and/or times.

In one example, determining λ can be done by determining a desired stopping distance d. For example, relevant literature provides a basis for determining λ according to a desired comfortable distance, denoted herein $d_{comfort}$, for stopping a vehicle 102 at a target location 220. That is, an approach index $K_{dB_c}$ can be defined and determined based on a vehicle 102 velocity relative to another vehicle, the other vehicle's velocity, and a distance between the vehicles as follows.

$$\phi(V_r, V_p, d) = K_{dB_c}(0.2) + 22.66 \log_{10} d - 74.71 \tag{7}$$

$$= \Delta c \begin{cases} \Delta c = 0 \text{ for collision avoidance} \\ \Delta c = -3 \text{ dB for comfort.} \end{cases}$$

Based on Equation 7, the distance can be determined $d_{comfort}$ as a function $d_{comfort} = f(v_{host}, v_{target})$, i.e., based on a host vehicle 102 velocity (or speed) and a target velocity (or speed), which in the present context is zero, i.e., the target location 220 is stationary.

Thus, returning to Equation 6, λ can be chosen so that vehicle 102 deceleration is initiated at the distance $d_{comfort}$.

$$\lambda \geq \frac{\frac{u_{min}v + v}{D}}{d_{comfort} - b - \frac{v^2}{2D}}, \tag{8}$$

where $u_{min}$ can be empirically determined as the minimum amount of deceleration at which a vehicle 102 occupant is determined to perceive deceleration being initiated. By empirical testing, e.g., operating a vehicle on a road or test track, λ can be determined for a vehicle 102 (e.g., for a make, model, and/or size, etc.) by a vehicle computer 104 and/or a user recording various minimum decelerations and distances $d_{comfort}$.

FIG. 3 illustrates an example process 300 for controlling vehicle 102 deceleration. The process 300 can be implemented, for example, according to program instructions executable in a vehicle computer 104. The process 300 may begin in a block 305, wherein the process 300 enters a standby mode, typically when a vehicle is powered on, e.g., as part of an ignition on cycle. In the standby mode, the computer 104 monitors data available on the vehicle network 106 from vehicle sensors 108 that may indicate that the vehicle is approaching a target location 220. For example, camera sensors 108 could provide data indicating that a stop sign or traffic light is a distance d on the vehicle 102 on a roadway 205. Alternatively or additionally, the computer 104 could store, or could obtain from another computing device or memory on the vehicle network 106, and/or from a remote server 118, map data indicating a target location 220 on a route or roadway 200 by being traversed by the vehicle 102.

From the standby mode block 305, the process 300 can proceed to a block 310 in which the computer 104 determines whether data obtained in the standby mode provides a request to stop at a target location 220. For example, adaptive or automatic cruise control (ACC) or an automatic emergency braking (AEB) feature could provide a request to stop at a target location 220. The process 300 can proceed from the block 305 to the block 310 periodically, e.g., every 500 milliseconds, every second, etc., to evaluate sensor data received in the computer 104 since a last execution of the block 310. As just mentioned, the request to stop at a target location 220 can be based on identifying the target location 220 from sensor data, e.g., a red or yellow traffic light detected in camera sensor data, a stop sign, a marking on a roadway, etc. Alternatively or additionally, the request to stop at target location 220 can be determined from map data as mentioned above. It further alternatively or additionally, a request to stop at a target location 220 could be provided by user input via a vehicle HMI 112. If a request to stop at a target location 220 is indicated, then the process 300 proceeds to a block 315. Otherwise, the process 300 proceeds to a block 345.

Next, in a block 315, the computer 104 determines the tuning variable $\lambda$ discussed above, e.g., according to Equation 8, e.g., using current vehicle velocity data as well as stored values for $u_{min}$, D, b, and $d_{comfort}$. Alternatively or additionally, the computer 104 could store values for $\lambda$ in a table that provided values for $\lambda$ according to a current vehicle 102 velocity. Values for $u_{min}$, D, b, and $d_{comfort}$, and alternatively or additionally, values for $\lambda$, could be obtained via empirical testing, for example.

Next, in a block 320, the computer 104 determines a distance d of the vehicle 102 from the target location 220. For example, as illustrated in FIG. 2, the target location 220 could be on a line on a roadway 205 indicating a location at which the vehicle 102 should stop when a traffic light 225 is red. Alternatively, the target location 220 could be a point on another vehicle that is either stopped or moving. The computer 104 can determine the distance d of the vehicle 102 from the target location 220 by using vehicle sensor data, for example. In one example, the target location 220 can be indicated by map data, and the vehicle computer 104 can determine current vehicle 102 coordinates and coordinates of the target location 222 determine the distance d. In another example, vehicle sensor data such as camera data can be used to determine a current distance of the vehicle 102 from the target location 220. Moreover, as noted above, a target location 220 could be adjusted after an initial iteration of the process 300. The distance d determined in the block 320 would then be according to the adjusted target location 220.

Next, in a block 325, the computer 104 vehicle 102 velocity with respect to the determined distance d, e.g., according to Equation 3 above, to determine whether a control input u, is needed, i.e., if Equation 3 is violated with no control input, then a control input is needed and can be provided, e.g., according to Equation 6 above, e.g., a deceleration request can provided to a vehicle ECU that controls braking. Put another way, if Equation 3 is not violated, then this means that, by solving Equation 6, the control input u would be a positive acceleration request, which is undesirable, and process 300 should continue to iterate until the control input to decelerate the vehicle 102 is actually needed. It should be noted that the CBF and/or constraints used in the process 300 could be different than as set forth in the exemplary equations herein, which are provided as illustrative non-limiting examples.

In the block 330, the computer 104 determines whether a solution was obtained to the CBF in the block 325 that satisfies constraints. For example, if the control input u cannot be found that satisfies the inequality of Equation 6, then a solution satisfying the constraints has not been found. This means that a control input is not yet needed to stop the vehicle at the target location 220. Thus, the computer 104 can be programmed to actuate the vehicle to negative acceleration, e.g., actuate the vehicle brakes, based on the acceleration output from the control barrier function only if actuating the vehicle brakes is needed for the constraint to be satisfied. If control is not needed, the process 300 returns to the block 315. Otherwise, the block 335 is executed next.

In the block 335, the control input u is provided to a vehicle ECU, e.g., a brake control module, to actuate the vehicle. As will be appreciated, the computer 104 could actuate a vehicle 102 propulsion in addition to or as an alternative to vehicle 102 braking to cause negative acceleration of the vehicle 102.

In a block 340, the computer 104 determines whether the vehicle 102 is stopped, i.e., whether a velocity of the vehicle 102 is currently zero. If not, then the process 300 returns to a block 320. Otherwise, the process 300 proceeds to a block 345.

The computer 104 determines whether the process 300 is to continue. For example, a vehicle 102 could be powered off, a user could provide input to deactivate a feature by which the control input was determined and provided, etc. If the process 300 is to continue, then the process 300 returns to the block 305. Otherwise, the process 300 ends following the block 345.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The term exemplary is used herein in the sense of signifying an example, e.g., a reference to an exemplary widget should be read as simply referring to an example of a widget.

Use of in response to, based on, and upon determining herein indicates a causal relationship, not merely a temporal relationship. For example, the statement "A is based on B" means that A not only follows B and time, but is a result at least in part of B. Further, unless explicitly stated otherwise, "based on" includes partly based on in addition to completely based on. Put another way, "based on," unless explicitly stated otherwise, means "based at least in part on."

The invention claimed is:

1. A system comprising a computer including a processor and a memory, the memory storing instructions executable by the processor such that the computer is programmed to:
   determine a target location for a vehicle;
   based on a vehicle speed and a distance to the target location, determine a unitless tunable acceleration parameter;
   determine an acceleration constraint, based on the unitless tunable acceleration parameter, for a control barrier function that outputs an acceleration to stop the vehicle at the target location; and
   upon solving the control barrier function to satisfy the acceleration constraint, actuate the vehicle to decelerate based on the acceleration output from the control barrier function.

2. The system of claim 1, wherein the acceleration output specifies a negative acceleration.

3. The system of claim 1, wherein actuating the vehicle to decelerate includes one of actuating vehicle braking or vehicle propulsion.

4. The system of claim 1, wherein the constraint is further determined based on the vehicle speed and the distance to the target location.

5. The system of claim 1, wherein the instructions further include instructions to, after actuating the vehicle to decelerate based on the acceleration output from the control barrier function:
   determine a second vehicle speed and a second distance to the target location;

determine a second constraint;
compute a second acceleration output from the control barrier function to satisfy the second constraint; and
actuate the vehicle to decelerate based on the second acceleration output from the control barrier function.

6. The system of claim 1, wherein the instructions further include instructions to actuate the vehicle to decelerate based on the acceleration output from the control barrier function only if actuating the vehicle is needed for the constraint to be satisfied.

7. The system of claim 4, wherein the instructions further include instructions to, after determining that actuating the vehicle is not needed for the constraint to be satisfied:
   determine a second vehicle speed and a second distance to the target location;
   determine a second tunable acceleration parameter based on the second vehicle speed and the second distance to the target location;
   determine a second constraint based on the second tunable acceleration parameter;
   compute a second acceleration output from the control barrier function to satisfy the second constraint;
   determine that actuating the vehicle to decelerate is needed for the second constraint to be satisfied; and
   actuate the vehicle to decelerate based on the second acceleration output from the control barrier function.

8. The system of claim 1, wherein the control barrier function includes the distance of the vehicle from the target location at a current time.

9. The system of claim 8, wherein the control barrier function includes a velocity of the vehicle at the current time.

10. The system of claim 1, wherein the control barrier function includes a maximum deceleration parameter.

11. The system of claim 1, wherein the control barrier function includes a buffer parameter.

12. The system of claim 1, wherein the target location is determined based on map data.

13. The system of claim 1, wherein the target location is determined based on vehicle sensor data.

14. The system of claim 1, wherein the instructions further include instructions to enter a standby mode of the system upon determining that the vehicle has stopped at the target location and then moved from the target location.

15. A method, comprising:
   determining a target location for a vehicle;
   based on a vehicle speed and a distance to the target location, determining a unitless tunable acceleration parameter;
   determining an acceleration constraint, based on the unitless tunable acceleration parameter, for a control barrier function that outputs an acceleration to stop the vehicle at the target location; and
   upon solving the control barrier function to satisfy the acceleration constraint, actuating the vehicle to decelerate based on the acceleration output from the control barrier function.

16. The method of claim 15, further comprising, after actuating the vehicle to decelerate based on the acceleration output from the control barrier function:
   determining a second vehicle speed and a second distance to the target location;
   determining a second constraint;
   computing a second acceleration output from the control barrier function to satisfy the second constraint; and
   actuating the vehicle to decelerate based on the second acceleration output from the control barrier function.

17. The method of claim 15, further comprising actuating the vehicle to decelerate based on the acceleration output from the control barrier function only if actuating the vehicle is needed for the constraint to be satisfied.

18. The method of claim 17, further comprising, after determining that actuating the vehicle is not needed for the constraint to be satisfied:

determining a second vehicle speed and a second distance to the target location;

determining a second tunable acceleration parameter based on the second vehicle speed and the second distance to the target location;

determining a second constraint based on the second tunable acceleration parameter;

computing a second acceleration output from the control barrier function to satisfy the second constraint;

determining that actuating the vehicle to decelerate is needed for the second constraint to be satisfied; and actuating the vehicle to decelerate based on the second acceleration output from the control barrier function.

19. The method of claim 15, wherein the control barrier function includes (a) the distance of the vehicle from the target location at a current time, and/or (b) a velocity of the vehicle at the current time.

20. The method of claim 15, wherein the control barrier function includes a maximum deceleration parameter.

\* \* \* \* \*